No. 756,728. PATENTED APR. 5, 1904.
W. G. STEWART.
THRESHING MACHINE.
APPLICATION FILED JUNE 26, 1903.
NO MODEL. 5 SHEETS—SHEET 1.

WITNESSES:
R. E. Hamilton.
P. L. Britain

INVENTOR
William G. Stewart
By Warren D. House,
His Attorney.

No. 756,728. PATENTED APR. 5, 1904.
W. G. STEWART.
THRESHING MACHINE.
APPLICATION FILED JUNE 26, 1903.
NO MODEL. 5 SHEETS—SHEET 3.

Fig 3

WITNESSES: INVENTOR
R. E. Hamilton. William G. Stewart
P. L. Britain. By Warren D. House
His Attorney No. 756,728. PATENTED APR. 5, 1904.
W. G. STEWART.
THRESHING MACHINE.
APPLICATION FILED JUNE 26, 1903.
NO MODEL. 5 SHEETS—SHEET 4.

WITNESSES:
R. E. Hamilton.
P. L. Britain.

INVENTOR
William G. Stewart
By Warren D. House,
His Attorney

THE NORRIS PETERS CO., PHOTO-LITHO., WASHINGTON, D. C.

No. 756,728. Patented April 5, 1904.

UNITED STATES PATENT OFFICE.

WILLIAM G. STEWART, OF EXCELSIOR SPRINGS, MISSOURI, ASSIGNOR OF ONE-HALF TO CHARLES W. BECHTEL, OF KANSAS CITY, MISSOURI.

THRESHING-MACHINE.

SPECIFICATION forming part of Letters Patent No. 756,728, dated April 5, 1904.

Application filed June 26, 1903. Serial No. 163,160. (No model.)

*To all whom it may concern:*

Be it known that I, WILLIAM G. STEWART, a citizen of the United States of America, residing in Excelsior Springs, in the county of Clay and State of Missouri, have invented a new and useful Improvement in Threshing-Machines, of which the following is a specification, reference being had therein to the accompanying drawings, forming a part thereof.

My invention relates to improvements in threshing-machines.

The object of my invention is to provide a threshing-machine which has large capacity and cleanly separates the grain from the straw and chaff.

My invention provides a separating mechanism comprising an inner rotatable hollow drum provided with openings in its periphery for the passage of chaff to the interior of the drum, two hollow outer rotatable drums encircling the inner drum provided each in its periphery with openings for the passage of grain to the exterior of the outer drum, a feed-space being provided between the adjacent ends of the outer drums through which the straw and grain threshed by the cylinder is fed upon the outer periphery of the inner drum and between the said drum and the two outer drums. Means are provided, further, for dividing the straw and grain thus fed and forcing it lengthwise of and between the inner and outer drums.

My invention provides, further, means by which the chaff which enters the inner drum is discharged through both ends of the same.

My invention provides, further, a row of teeth encircling the periphery of the inner drum adjacent to the feed-space, whereby the straw is seized and divided into two parts, which are carried in opposite directions and are discharged from between the inner and the outer drums.

My invention provides, further, two spiral flanges mounted upon and encircling the outer periphery of the inner drum, the said flanges being inclined in opposite directions, the said flanges being disposed one at each side of the feed-space, whereby the straw is carried by the said two flanges in opposite directions and is discharged from both ends of the drums.

My invention provides, further, two discharge-pipes disposed one at each end of the inner drum for receiving the straw discharged from the inner and outer drums, means being provided for ejecting the straw discharged into the two said pipes.

My invention provides, further, two centrifugal fans disposed one at each end of the inner drum for creating a draft by means of which the straw is ejected from the discharge-pipe.

My invention provides, further, means for regulating the force of the draft of air through the said discharge-pipes.

My invention provides, still further, a casing encircling the outer drum for receiving therein the grain discharged from the said outer drum, a space being provided in the said casing below the outer drums for receiving therein the grain which passes therethrough by gravity.

My invention provides, further, two grain-elevating devices connected with the said casing for discharging the grain deposited therein at either of two places and means by which the discharge of the grain may be controlled, so as to be elevated by the particular elevator selected for the purpose.

Other novel features are hereinafter fully described and claimed.

By feeding the straw upon the middle of the inner drum and then dividing it and forcing it in opposite directions between the inner and outer drums double the capacity for separating grain from the straw and chaff is obtained than would be obtained by feeding the grain in one direction only. By forcing the chaff in the interior of the inner drum from the middle toward the two ends of the drum double the capacity for disposing of the chaff is obtained.

In the accompanying drawings, which illustrate my invention.

3 is a top view, some of the parts being shown in horizontal section and others broken away.

Similar characters of reference indicate similar parts.

Figure 1:
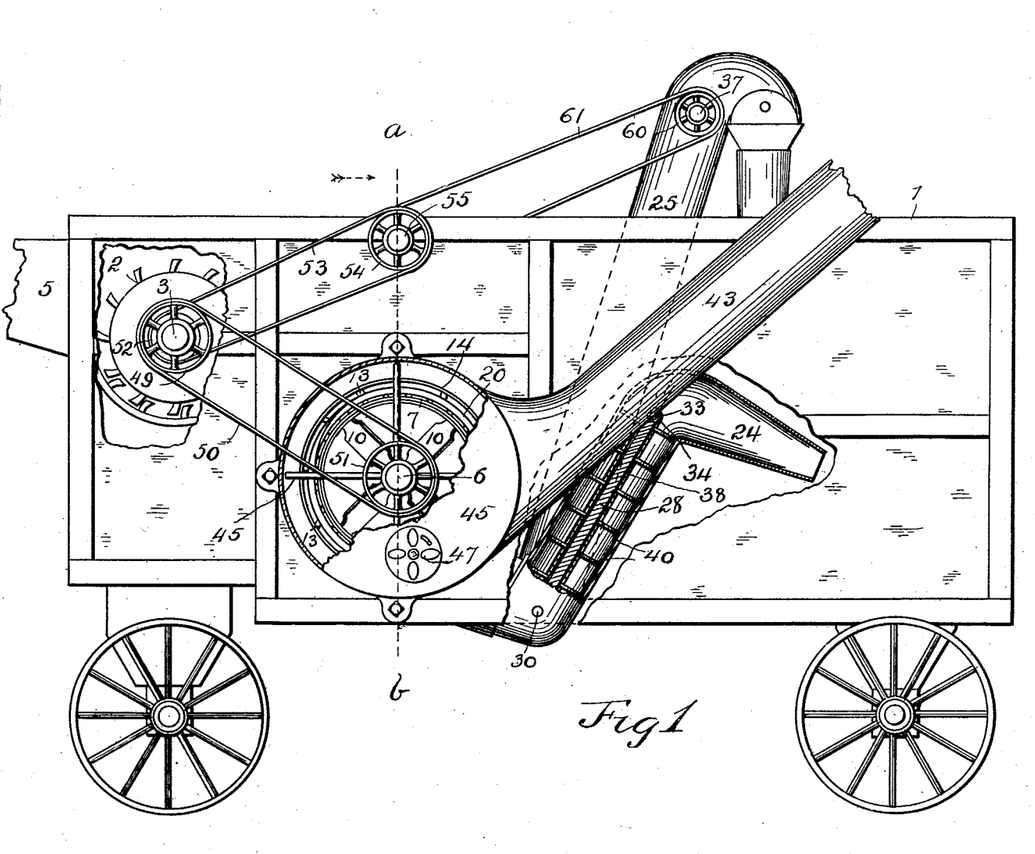
Figure 1 is a side elevation view, parts being broken away and others shown in vertical sections.
Figure 2:
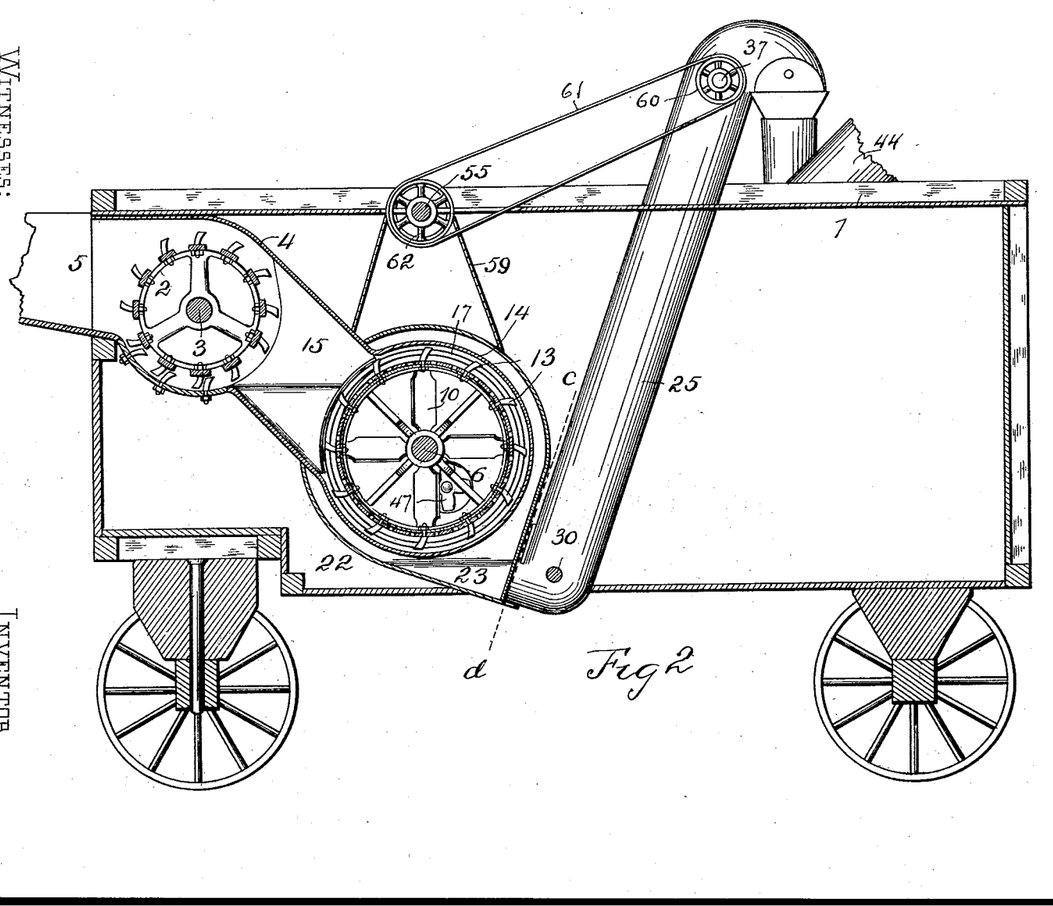
Fig. 2 is a longitudinal central vertical sectional view. Fig.
Figure 3:
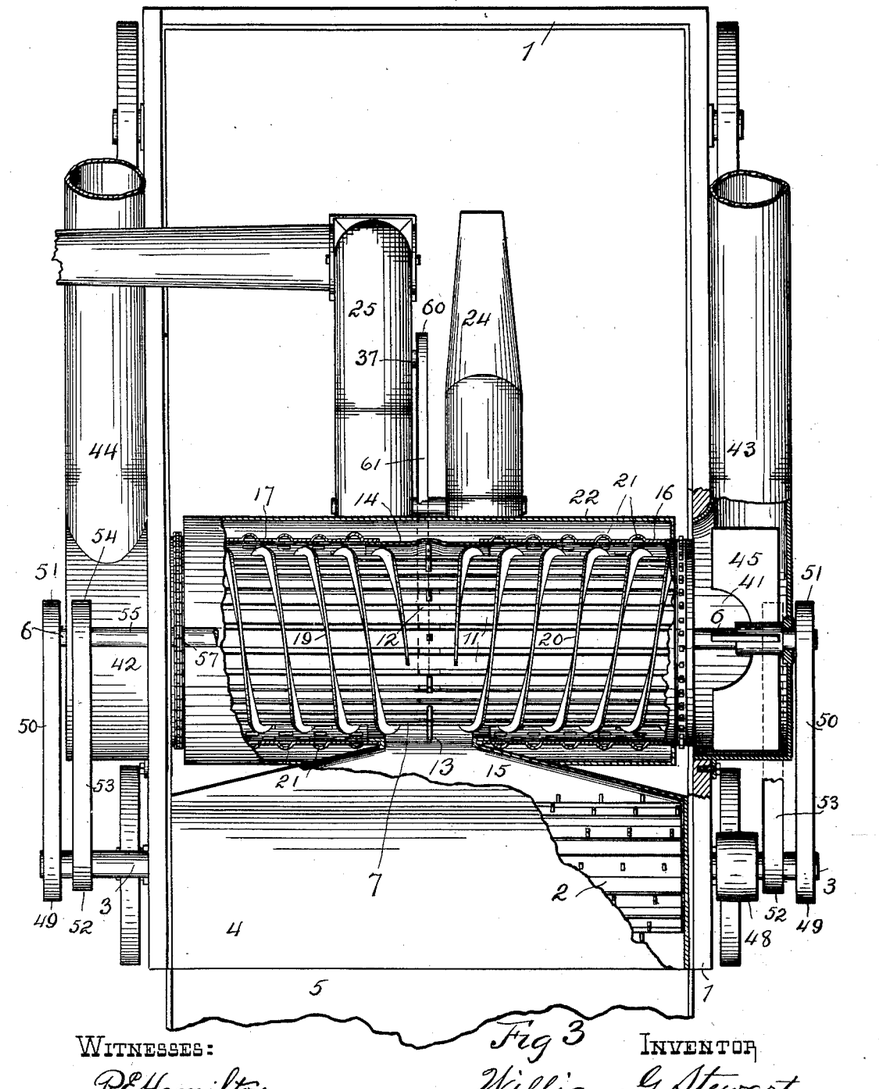
Figure 4:
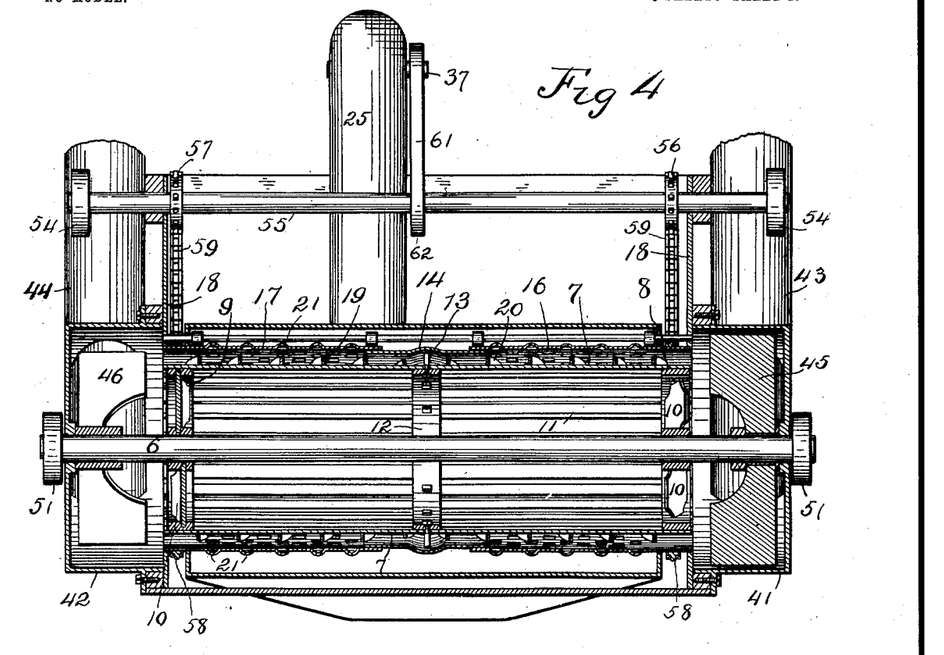
Fig. 4 is a vertical sectional view, taken on the dotted line *a b* of Fig. 1, looking in the direction indicated by the arrow.
Figure 5:
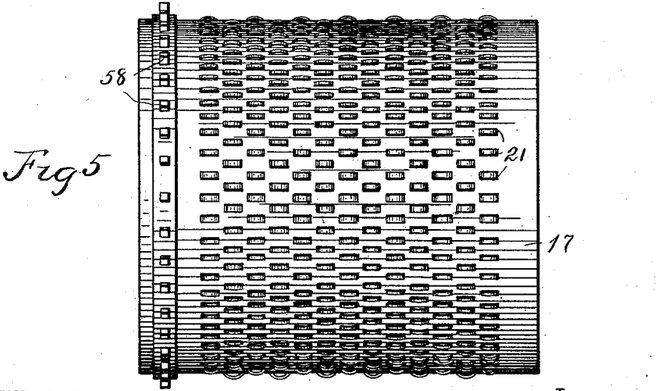
Fig. 5 is a side elevation view of one of the outer drums.
Figure 6:
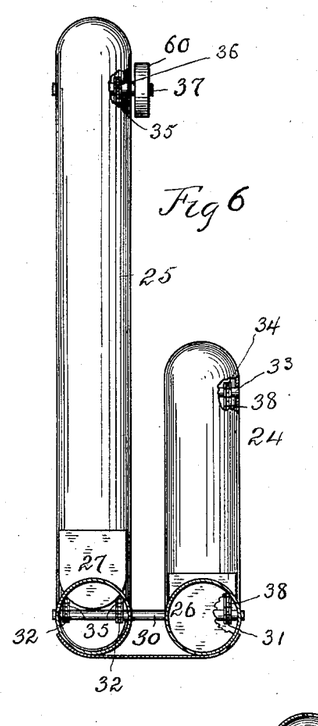
Fig. 6 is a transverse vertical sectional view taken on the dotted line *c d* of Fig. 2 and showing the two grain-elevating devices.
Figure 7:
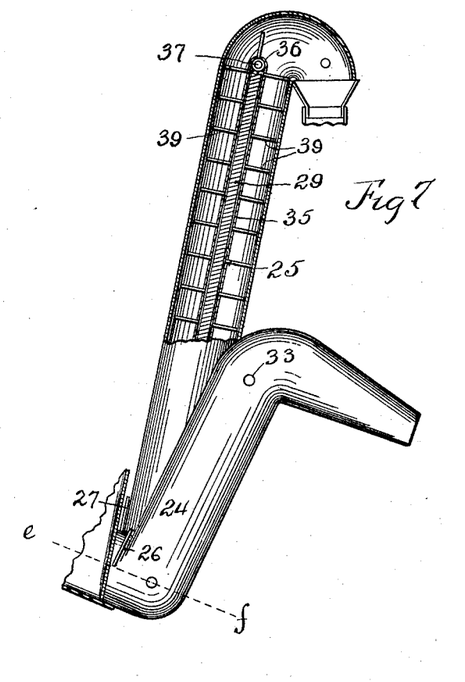
Fig. 7 is a side elevation view of the elevating devices, the longer one being shown in central vertical section.
Figure 8:
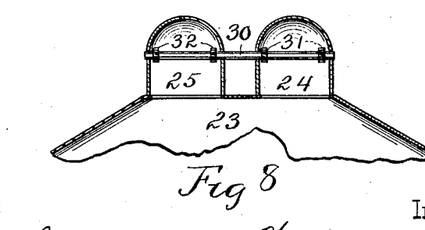
Fig. 8 is a transverse sectional view taken on the dotted line *e f* of Fig. 7.

1 indicates the frame of the machine, which may be of the ordinary rectangular box-like construction. Within the frame 1, near the upper and forward ends, is placed the ordinary toothed threshing-cylinder 2, mounted on the shaft 3, the ends of which are rotatably mounted in sides of the frame 1. The cylinder 2 has its sides inclosed by a casing 4, in the forward end of which is provided a feed-opening 5, through which the material to be threshed is inserted. To the rear of and lower than and parallel with the cylinder-shaft 3 is a horizontal shaft 6, which extends through and is rotatable in bearings provided in the sides of the frame 1. Secured upon and rotatable with the shaft 6 and located within the frame 1 is the inner drum of the grain-separating mechanism. This inner drum (indicated by 7) comprises the following mechanism: Upon the shaft 6, disposed, respectively, near the sides of the frame 1 and rotatable with said shaft are two wheels 8 and 9, the spokes 10 of which are inclined, as shown in Fig. 4, the inclination of the spokes in the wheel 8 being opposite to that of the spokes in the wheel 9. When the shaft 6 is revolved, the spokes 10 serve as fans for drawing the chaff outwardly from the center of the drum. The opposite disposition of the inclination of the spokes 10 causes two currents of air to be formed within the inner drum 7, the direction of the said current being from the center toward the two ends of the said drum. Upon the peripheries of the wheels 8 and 9 are secured a series of longitudinal bars 11, disposed parallel with the shaft 6 and having spaces or openings between them for the passage of chaff from the outside to the interior of the drum 7. Parallel with the wheels 8 and 9 and secured centrally to the inner side of the bars 11 is a ring 12, to the outer periphery of which are secured at their inner ends a series of teeth 13, which extend beyond the outer side of the bars 11 and serve to seize and divide into two parts the threshed straw, grain, and chaff fed upon the center of the outside of the drum 7 from the threshing-cylinder 2. Encircling the center of the drum 7 is a cylindrical casing 14, open at its ends and having a feed-opening at its forward side connected by a tube 15 with the casing 4, the rear side of which is provided with an opening for the discharge of the straw and grain from the cylinder 2. Two outer rotatable hollow drums 16 and 17 encircle concentrically the drum 7. A space is provided between the drums 16 and 17. This space is bridged by the casing 14, the ends of which enter, respectively, the inner end of the drums 16 and 17 and provide bearings for the said drums to rotate upon. The outer ends of the drums 16 and 17 are rotatively mounted in the vertical plates 18, respectively disposed one upon each inner side of the framework 1. Upon the drum 7 and secured to the bars 11 thereof are two oppositely-inclined spiral flanges 19 and 20, respectively, which encircle the drum 7 and are disposed one at each side of the row of teeth 13. The inclination of the flanges 19 and 20 is such that when the drum 7 is rotated in the proper direction the straw fed upon the outer periphery of the drum 7 and divided by the teeth 13 will be fed in opposite directions or toward the end of the drum 7 and between the said drum and the drums 16 and 17. The continuous rotation of the drum 7 will cause the straw thereupon to be discharged by the spiral flanges from between the inner and the outer drums. Each of the drums 16 and 17 is provided with a series of rows of openings disposed in parallel planes around the periphery of the drum. These openings are formed each by forcing outwardly-curved portions of the metal forming the drum. These curved portions are indicated by 21. The sides of the raised portions 21 are cut lengthwise of the drum, thus forming the openings for the passage of grain from the interior to the exterior of the drums 16 and 17. The raised portions 21 of a row are disposed so as to alternate between the similar raised portions of the rows at each side. This disposition of the peripheral openings of the drums 16 and 17 is for the purpose of more surely catching all the grain and causing it to be discharged through the said openings. Encircling the outer drums 16 and 17 is a casing 22, the lower side of which is disposed below the drum and forms a chamber 23, into which the grain discharged from the drums 16 and 17 falls by gravity. Two upwardly-extending tubes 24 and 25 have their lower ends connected with the rear lower side of the casing 22, the lower ends of the said tubes being forwardly turned and connected with the chamber 23, the rear side of which is provided with two openings for discharging grain into the tubes 24 and 25. The lower forward ends of each of the tubes 24 and 25 is provided with a slidable gate or valve upwardly and downwardly movable in a slot provided for the purpose in the forwardly-extending portion of the tube. These gates are indicated by 26 and 27, respectively. The tubes 24 and 25 are provided, respectively, with the central longitudinal partitions 28 and 29, which extend from near the lower ends of the tubes to near the upper ends thereof. A horizontal rotatable shaft 30, disposed below the lower ends of the said partitions, extends through the tubes 24 and 25. Upon the shaft 30, within the tube 24 and rotatable with the said shaft, are mounted two sprocket-wheels 31. Two sprocket-wheels 32 are similarly mounted upon the shaft 30 within the tube 25. In the tube 24 above the partition 28 is placed a rotatable shaft 33, on which are mounted and rotated therewith two sprocket-wheels 34, one only of which is shown in Fig. 1, the other being shown in Fig. 6. Two sprocket-chains 35 connect the sprocket-wheels 32 with two similar sprocket-wheels 36, mounted upon and rotatable with a horizontal rotatable shaft 37, mounted in the tube 25 above the partition 29. Two similar sprocket-chains 38 connect the sprocket-wheels 31 with the sprocket-wheels 34 on the shaft 33. Upon the sprocket-chains 35 are secured a series of transverse paddles 39, which when the chains 35 are driven, as hereinafter described, carry the grain upwardly from the lower end of the tube 35 and discharge it from the upper end thereof. A series of transverse paddles 40 are similarly mounted upon chains 38 and perform similar functions in the tube 24. In order that the straw which is fed from between the ends of the drums 16 and 17 may be removed clear from the machine, together with the chaff discharged from the drum 7 by the fan-blades 10, the following mechanism is provided. Upon each side of the frame 1 and disposed oppositely to and concentrically with the drums 16 and 17 are two casings 41 and 42, circular in form, with closed outer ends, the inner ends being open and their diameters being greater than the diameters of the drums 16 and 17. Two upwardly-inclined tubes 43 and 44 are connected at their lower ends with the interiors and at the rear sides of the casings 41 and 42, respectively. These tubes 43 and 44 serve to carry away the chaff and straw from the casings 41 and 42. The shaft 6 extends through the casings 41 and 42 and has secured upon and rotatable with it within the casings 41 and 42, respectively, the centrifugal fans 45 and 46. These fans being rotated very rapidly with the shaft 6 force the straw from the casings 41 and 42 outwardly through the pipes 43 and 44. Each of the casings 41 and 42 is provided with a regulatable air-inlet, preferably of the form of the butterfly damper or ventilator, such as are commonly used in stovepipes. These ventilators are indicated by 47. By regulating the ventilators 47 the force of the draft through the pipes 43 and 44 may be varied to suit the will of the operator.

Rotation of the drums 7, 16, and 17 and driving of the elevating mechanism in the tubes 24 and 25 is obtained by the following mechanism: Upon one end of the shaft 3 is secured a pulley 48, by means of which the shaft may be rotated by any desired power. (Not shown.) Upon the shaft 3 are secured, one near each end, two pulleys 49, connected, respectively, by the belts 50 with two pulleys 51, secured upon the shaft 6 outside the casings 41 and 42. Upon the shaft 3 are secured, near each end thereof, two pulleys 52, connected by belts 53, respectively, with two pulley-wheels 54, secured upon a horizontal transverse shaft 55, mounted in bearings provided one at each side of frame 1. Upon the shaft 55 are secured two sprocket-wheels 56 and 57. The drums 16 and 17 are provided each near its outer end with a series of teeth 58, arranged around the periphery of the drum. Engaging with these teeth and the sprocket-wheels 56 and 57, respectively, are two chain belts 59, which serve to impart rotation from the shaft 55 to the drums 16 and 17. Upon the inner end of the shaft 37 is secured a pulley-wheel 60, connected by a belt 61 with a pulley 62, mounted upon the shaft 55.

In operating my invention the cylinder 2 and the shaft 3 are rotated by means of power applied to the pulley 48. The rotation of the shaft 3, through the mechanism already described, causes rotation of the drum 7 and the drums 16 and 17, the drum 7 being driven in the same direction, but at much greater speed than the outer drums 16 and 17. At the same time the grain-elevating belts and paddles in the tubes 24 and 25 are driven through the mechanism described. The grain to be threshed is inserted through the feed-opening 5, where it is seized and threshed by the rotating threshing-cylinder 2. It then passes through the passage 5 into the circular casing 14, where it is engaged by the teeth 13 and divided into two parts, the said parts being engaged by the spiral flanges 19 and 20, respectively, and forced in opposite directions between the drum 7 and the outer drums 16 and 17. The chaff passes to the interior of the drum 7 between the bars 11. The two currents of air caused by the fan-blades 10 forces the chaff into the casings 41 and 42, from which it is ejected, by means of the centrifugal fans 45 and 46, through the tubes 43 and 44. While the straw is passing outwardly between the inner and the outer drums the wheat carried with the straw is separated therefrom and passes from the drums 16 and 17 by way of the peripheral openings therein. The separated grain then passes by gravity into the chamber 23. If it is desired to further clean the grain, the valve 26 is raised, the valve 27 remaining closed. The grain will then pass into the tube 24, from which it is discharged, by means of the traveling paddles 40, into any desired form of recleaning device. If it is desired to discharge the grain into a wagon or receptacle outside of the frame 1, the valve 26 is closed and the valve 27 raised. The grain will then enter the tube 25, from the upper end of which it will be discharged by means of the traveling paddles 39.

My invention may be modified in many ways without departing from its spirit.

Having thus described my invention, what I claim, and desire to secure by Letters Patent, is—

1. In a threshing-machine, the combination with an inner rotatable hollow drum provided with openings in its periphery for the passage of the chaff, of two hollow outer rotatable drums encircling the inner drum and having a space between their inner ends and provided each in its periphery with openings for the passage of grain, means for feeding the straw and grain through the said space and upon the outer periphery of the inner drum, and means for dividing the straw thus fed upon the inner drum, and forcing it oppositely between the inner drum and the two outer drums toward the two ends of the inner drum.

2. In a threshing-machine, the combination with an inner rotatable hollow drum provided with openings in its periphery for the passage of the chaff, of two hollow outer rotatable drums encircling the inner drum and having a space between their inner ends and provided each in its periphery with openings for the passage of grain, means for feeding the straw and grain through the said space and upon the outer periphery of the inner drum, means for dividing the straw, thus fed upon the inner drum, and forcing it oppositely between the inner drum and the two outer drums toward the two ends of the inner drum, and means for ejecting the chaff from the interior of the inner drum through the two ends thereof.

3. In a threshing-machine, the combination with an inner rotatable hollow drum provided with openings in its periphery for the passage of the chaff, of two hollow outer rotatable drums encircling the inner drum and having a space between their inner ends and provided each in its periphery with openings for the passage of grain, means for feeding the straw and grain through the said space and upon the outer periphery of the inner drum, the outer periphery of the inner drum being provided with two spiral flanges encircling the same, the said flanges being inclined in opposite directions, whereby the straw coming into contact with the said two flanges is divided and forced lengthwise upon the inner drum in opposite directions.

4. In a threshing-machine, the combination with an inner rotatable hollow drum provided with openings in its periphery for the passage of the chaff, of two hollow outer rotatable drums encircling the inner drum and having a space between their inner ends and provided each in its periphery with openings for the passage of grain, means for feeding the straw and grain through the said space and upon the outer periphery of the inner drum, the outer periphery of the inner drum being provided with two spiral flanges encircling the same, the said flanges being inclined in opposite directions, whereby the straw coming in contact with the said two flanges is divided and forced lengthwise upon the inner drum in opposite directions, and means for ejecting the chaff from the interior of the inner drum through the two ends thereof.

5. In a threshing-machine, the combination with an inner rotatable hollow drum provided in its periphery with openings for the passage of chaff, of two rotatable fans disposed one at each end of the drum for drawing the chaff from the interior through the two ends of the drum, two hollow rotatable outer drums encircling the inner drum and having a feed-space between their inner ends, means for feeding the straw and grain upon the outer periphery of the inner drum through said feed-space, and means for dividing the straw thus fed and forcing it lengthwise upon the inner drum in opposite directions, the outer drums each being provided with passages in its periphery for the passage of the grain separated from the straw.

6. In a threshing-machine, the combination with an inner hollow rotatable drum provided in its periphery with openings for the passage of chaff to the interior thereof, and provided with a series of teeth encircling its outer periphery, of means for discharging the chaff from the inner drum through both its ends, two hollow rotatable outer drums encircling the inner drum and having a feed-space between them disposed opposite the said series of teeth, the said outer drums being each provided with openings in its periphery for the passage therethrough of grain, and means for forcing the straw fed into said feed-space upon the inner drum in opposite directions lengthwise of the inner drum and between the outer and the inner drums.

7. In a threshing-machine, the combination with an inner hollow rotatable drum provided in its periphery with openings for the passage of chaff to the interior of the drum, and provided with a series of teeth around its outer periphery, and having also on its outer periphery two oppositely-inclined spiral flanges encircling the drum and disposed one at each side of the said series of teeth, of means for discharging the chaff from the interior of the drum through both ends thereof, two hollow rotatable outer drums encircling the inner drum and provided with a feed-space between them disposed opposite the said teeth, and provided each with openings in its periphery for the passage of grain, and means for rotating the inner and outer drums.

8. In a threshing-machine, the combination with an inner hollow rotatable drum provided in its periphery with openings for the passage of chaff to the interior thereof, of two hollow rotatable outer drums encircling the inner drum and provided each with openings in its periphery for the passage therethrough of grain, the threshing-cylinder, means for conveying the threshed straw and grain from the threshing-cylinder upon the inner drum and into the inner ends of the outer drums, means for dividing the straw and grain thus fed and forcing it in opposite directions between the inner and outer drums toward the two ends of the inner drum, and means for discharging the chaff from the interior of the inner drum.

9. In a threshing-machine, the combination with the threshing-cylinder, of a hollow rotatable inner drum provided on its periphery with openings for the passage of chaff into the interior of the drum, two hollow rotatable outer drums provided each with openings in its periphery for the passage therethrough of grain, means for conveying the straw and grain from the threshing-cylinder to the outer periphery of the inner drum and between the said drum and the outer drums, means for dividing the straw and grain thus conveyed and forcing it in opposite directions from between the inner and the outer drums, and two rotatable fans disposed one at each end of the inner drum for drawing the chaff in two directions from the interior of the inner drum.

10. In a threshing-machine, the combination with the threshing-cylinder, of a hollow rotatable inner drum provided on its periphery with openings for the passage therethrough of the chaff, two hollow rotatable outer drums encircling the inner drum and having a space between their inner ends, means for conveying the threshed straw and grain from the threshing-cylinder to the outer periphery of the inner drum and between the same and the outer drums, means for dividing the straw thus conveyed and forcing it lengthwise in opposite directions along the inner drum, two discharge-pipes disposed one at each end of the inner cylinder for receiving the straw, means for forcing the discharged straw through the said pipes, and means for drawing the chaff from the interior of the inner drum.

11. In a threshing-machine, the combination with the threshing-cylinder, of a hollow rotatable inner drum provided with peripheral openings for the passage therethrough to the interior of the chaff, means for forcing the chaff therethrough and out from the ends of the drum, two hollow rotatable drums encircling the inner drum with a feed-space between their ends, means for conveying the straw and grain from the threshing-cylinder to said feed-space, means for dividing the same and forcing it in opposite directions between the inner and the outer drums, the outer drums being each provided with peripheral openings for the passage therethrough of the grain, and a casing encircling the outer drums for receiving the separated grain.

12. In a threshing-machine, the combination with the threshing-cylinder, of a hollow rotatable inner drum provided with peripheral openings for the passage to the interior of the drum of the chaff, means for withdrawing the chaff therefrom through both ends of the drum, two hollow rotatable drums encircling the inner drum and having a feed-space between them, means for conveying the straw and grain from the threshing-cylinder to said feed-space, each of the outer drums being provided with peripheral openings for the passage of grain, means for dividing the straw and grain thus fed and forcing it in opposite directions between the inner and the outer drums, two chambers each provided with a discharge-outlet, the said chambers being provided with inlets for receiving respectively the straw and chaff discharged from the drums, and means for ejecting the straw and chaff from the said chambers.

13. In a threshing-machine, the combination with an inner drum provided with peripheral openings for the passage to the interior of the chaff, of two outer drums encircling the inner drum and provided each with openings in its periphery for the passage therethrough of grain separated from the chaff and straw, means for drawing the chaff to the interior of the inner drum and discharging it through both ends of the drum, means for conveying the threshed straw and grain to the periphery of the inner drum and between the ends of the outer drums, means for dividing the straw and grain thus fed and forcing it in opposite directions between the inner and the outer drums, a casing encircling the outer drums for receiving the grain discharged therefrom, and means for rotating the said drums.

14. In a threshing-machine, the combination with an inner drum provided with peripheral openings for the passage of chaff to the interior of the drum, the drum being also provided with means for dividing the straw and grain and forcing it lengthwise along the drum in opposite directions, means for separating the grain from the straw during their passage along the drum, means for forcing the chaff to the interior of the drum and discharging it from both ends of the same, and means for rotating the drum.

15. In a threshing-machine, the combination with an inner rotatable drum provided with peripheral openings for the passage of chaff to the interior of the drum, of means for withdrawing the chaff therefrom and discharging it from both ends of the drum, two drums encircling the inner drum and having a space between their inner ends, means for feeding the straw and grain through said space upon the inner drum, means by which the straw and grain thus fed is divided and forced in opposite directions between the inner and the outer drums, the outer drums each being provided with peripheral openings for the passage therethrough of the grain, a casing encircling the outer drums for receiving the grain, and an elevating device connected with said casing for discharging the grain therefrom.

16. In a threshing-machine, the combination with an inner rotatable drum provided with peripheral openings for the passage of chaff, the drum being provided with two straw-engaging devices arranged spirally around the periphery of the drum, the inclination of the spirals being opposite, whereby the straw engaged thereby is forced in opposite directions upon the drum, of means for feeding the threshed straw and grain upon the drum between the said straw-engaging devices, and two outer rotatable drums encircling the inner drum and provided each with peripheral openings for the passage of the grain, and means for rotating the said drums.

17. In a threshing-machine, the combination with an inner drum provided with peripheral openings for the passage of chaff to the interior of the drum, of two outer drums encircling the inner drum, a space being provided between the inner and the outer drums and between the two outer drums into which the threshed grain and straw is fed, the outer drums being provided each with peripheral openings for the passage of grain separated from the straw, a casing encircling the outer drums for receiving the grain discharged therefrom, means for rotating the said drums, means for dividing the threshed grain and straw which is fed into the space between the drums and forcing it in opposite directions between the inner and the outer drums, means for discharging the chaff from the interior and through the two ends of the inner drum, two chambers provided with inlets for receiving the straw and chaff discharged from the ends of the drums, the said chambers being provided each with a discharge-outlet, means for discharging through the said outlets the chaff and straw from the said chambers, and means for rotating the inner and the outer drums.

18. In a threshing-machine, the combination with an inner drum provided with peripheral openings for the passage of chaff to the interior of the drum and having two peripheral oppositely-inclined spiral flanges leading respectively from near the middle toward the ends of the drum, of two outer drums encircling the inner drum and having a feed-space between the ends of the outer drums and between the said drums and the inner drum, each of the outer drums being provided with peripheral openings for the passage of grain separated from the straw, a casing encircling the outer drums for receiving the grain discharged from the said drums, means for rotating the inner and the outer drums, means for discharging the chaff from the interior of the inner drum through the ends thereof, two chambers provided with inlets disposed respectively so as to receive the straw and chaff discharged from the drums, the said chambers being provided each with a discharge-outlet and means for discharging through the said outlet the straw and chaff from the said chambers.

19. In a threshing-machine, the combination with a rotatable inner drum provided with peripheral openings for the passage of the chaff to the interior of the drum, of two outer rotatable drums encircling the inner drum with a feed-space between the ends of the outer drums and between the said drums and the inner drum, the said outer drums being each provided with peripheral openings for the passage of the grain separated from the straw, a casing encircling the said outer drums for receiving the grain discharged therefrom, two devices for conveying the grain from the said casing, and means for controlling the passage of the grain from the said casing to the said devices.

20. A separating-drum for a threshing-machine comprising a tubular body having peripheral openings for the passsage of chaff to the interior of the body, a series of teeth arranged around and projecting from the periphery of the body, and two straw-engaging devices arranged spirally around the body and leading respectively in opposite directions from said teeth, the inclination of the spirals being in opposite directions.

21. A separating-drum for a threshing-machine comprising a tubular body having peripheral openings for the passage of the chaff to the interior thereof, a series of teeth arranged around and projecting from the periphery of the body, and two spiral flanges encircling the periphery of the body and leading respectively in opposite directions from said teeth, the inclination of the said spiral flanges being in opposite directions.

22. A separating-drum for a threshing-machine comprising a tubular body having peripheral openings for the passage of the chaff to the interior of the body, the body being provided with two fans disposed transversely within the same and near the ends thereof, the blades or wings of one fan being inclined oppositely to the blades or wings of the other fan.

23. A separating-drum for a threshing-machine comprising a tubular body having peripheral openings for the passage of the chaff to the interior of the body, the body being provided with two fans disposed transversely within the same and near the ends thereof, the blades of one fan being disposed oppositely to the blades of the other fan, and two straw-engaging devices arranged spirally around the body and leading respectively in opposite directions from near the middle toward the ends of the body, the flanges being oppositely inclined.

24. A separating-drum for a threshing-machine comprising a tubular body having peripheral openings for the passage of chaff to the interior of the body, the body being provided with two fans disposed transversely within and near the ends thereof, the blades of one fan being inclined oppositely to the blades of the other fan, and two spiral flanges encircling the periphery of the body in opposite directions from near the middle toward the ends thereof, the said flanges being oppositely inclined.

25. A separating-drum for a threshing-machine comprising a tubular body having peripheral openings for the passage of chaff to the interior of the body, the body being provided inside with two transverse fans disposed near the ends thereof, the blades of one fan being inclined oppositely to the blades of the other fan, a series of teeth arranged around and projecting from the periphery of the body, and two straw-engaging devices arranged spirally around the body and leading respectively in opposite directions from said teeth, the spirals being oppositely inclined.

26. A separating-drum for a threshing-machine comprising a tubular body having peripheral openings for the passage of chaff to the interior of the body, the body being provided with two fans disposed transversely within and near the ends thereof, the blades of one being inclined oppositely to the blades of the other fan, a series of teeth arranged around and projecting from the periphery of the body, and two flanges spirally encircling the body and leading respectively in opposite directions from said teeth, the flanges being oppositely inclined.

27. A separating-drum for a threshing-machine comprising two wheels which form the ends of the drum, the spokes of each wheel being inclined at an angle to a plane parallel to the ends of the wheel, thus forming fan-blades, the spokes of one wheel being inclined oppositely to the spokes of the other wheel, and a series of bars secured to and disposed longitudinally at suitable intervals around the peripheries of the said two wheels.

28. A separating-drum for a threshing-machine comprising two wheels which form the ends of the drum, the spokes of each wheel being inclined at an angle to a plane parallel to the ends of the wheel, thus forming fan-blades, the spokes of one wheel being inclined oppositely to the spokes of the other wheel, a series of bars secured to and disposed longitudinally at suitable intervals around the peripheries of the said two wheels, and two spiral flanges secured upon the outside of said bars, the said flanges being oppositely inclined and leading from near the middle of said bars toward the ends thereof.

29. A separating-drum for a threshing-machine comprising two wheels which form the ends of the drum, the spokes of each wheel forming fan-blades and being inclined to a plane parallel with the ends of the wheel, the spokes of one wheel being inclined oppositely to the spokes of the other wheel, a series of longitudinal bars secured to and disposed at suitable intervals around the peripheries of the said two wheels, a ring between the said two wheels and to the peripheries of which the said bars are secured, a series of teeth arranged around the periphery of the said ring and projecting beyond the said bars, and two oppositely-inclined spiral flanges secured upon the outside of said bars, the said flanges leading respectively in opposite directions from the said teeth and toward the ends of the said bars.

30. In a threshing-machine, the combination with a rotatable threshing-cylinder, of a rotatable separating-drum provided with peripheral openings for the passage of chaff to the interior of the said drum, two outer drums encircling the said drum and provided each with peripheral openings for the passage of grain, a space being provided between the ends of the outer drums and between the said drums and the inner drum, a casing encircling the inner drum having open ends disposed respectively in the ends of the outer drums, means for conveying the straw and grain threshed by the threshing-cylinder into the said casing, means for dividing the straw and grain so conveyed into two parts, means for forcing the said two parts in opposite directions between the inner and the outer drums and toward the ends thereof, and means for rotating the said threshing-cylinder and the said drums at the proper speed.

31. In a threshing-machine, the combination with a rotatable threshing-cylinder, of a rotatable drum provided with peripheral openings for the passage of chaff to the interior thereof, and having a series of teeth disposed around the periphery of said drum, the drum being provided also with two oppositely-inclined spiral flanges encircling the same and leading respectively from the said teeth toward the ends of the drum, two outer drums encircling the inner drum and provided each with peripheral openings for the passage of grain, a space being provided between the ends of the outer drums and between the same and the inner drum, a casing encircling the inner drum and having open ends disposed respectively in the ends of the outer drums, means for conveying the straw and grain from the threshing-cylinder into said casing, and means for rotating the inner and outer drums and the threshing-cylinder at the proper speed.

In testimony whereof I have signed my name to this specification in presence of two subscribing witnesses.

WILLIAM G. STEWART.

Witnesses:
   WARREN D. HOUSE,
   HENRY F. ROSE.